United States Patent [19]

Lee

[11] Patent Number: 5,272,542
[45] Date of Patent: Dec. 21, 1993

[54] REMOTE TRACKING CONTROL SYSTEM FOR A VIDEO CASSETTE TAPE RECORDER

[75] Inventor: KwaNg H. Lee, Kyungki, Rep. of Korea

[73] Assignee: Goldstar Co., Ltd., Rep. of Korea

[21] Appl. No.: 636,406

[22] Filed: Dec. 31, 1990

[30] Foreign Application Priority Data

Dec. 30, 1989 [KR] Rep. of Korea ............... 20659/1989

[51] Int. Cl.$^5$ .............................................. H04N 9/89
[52] U.S. Cl. .................................... 358/321; 358/322; 360/71
[58] Field of Search ................... 358/321, 322; 360/71

[56] References Cited
U.S. PATENT DOCUMENTS 4,494,153 1/1985 Ravizza ................................. 358/324

Primary Examiner—David L. Robertson
Attorney, Agent, or Firm—Ostrolenk, Faber, Gerb & Soffen

[57] ABSTRACT

A remote tracking control system for controlling the tracking operation by varying a reference signal of a reference phase counter by tracking up/down key signal of a remote transmitter. The system comprising a frequency demultiplier, a capstan counter, a NOR gate, a one-shot generator, microcomputer, a tracking monostable multivibrator, a reference phase counter, a comparator, a latch, a pulse width modulation signal generator, a pulse width modulation signal gate, a low pass filter, and an operational amplifier.

3 Claims, 3 Drawing Sheets

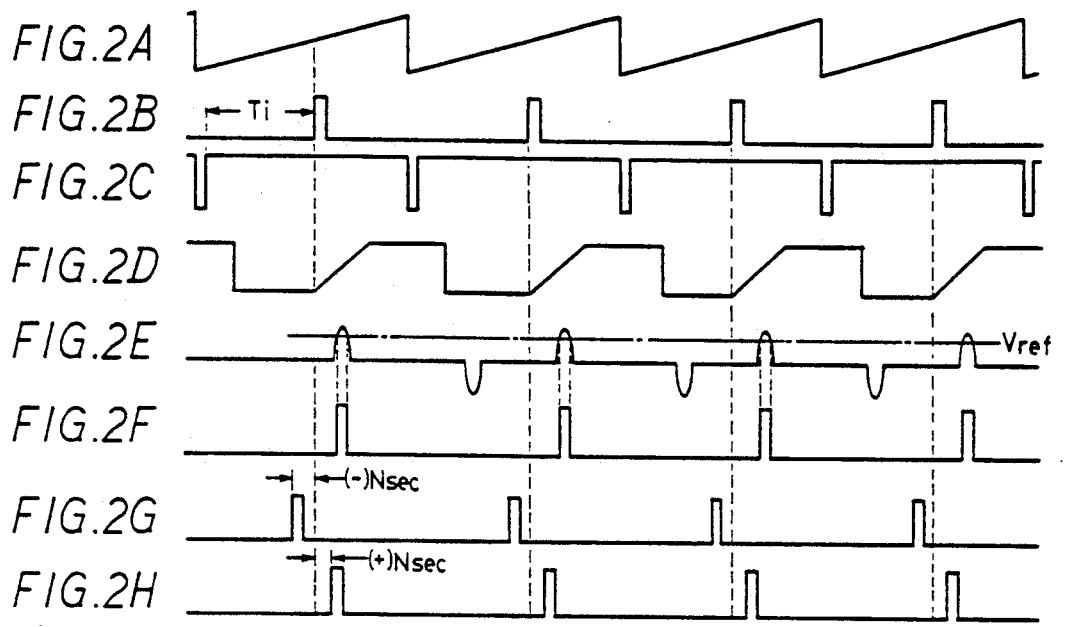

REMOTE TRACKING CONTROL SYSTEM FOR A VIDEO CASSETTE TAPE RECORDER

BACKGROUND OF THE INVENTION

The present invention relates to a tracking control system for a video cassette tape recorder and more particularly, to a remote tracking control system which controls the tracking by a remote control signal in reproducing a tape.

A conventional tracking control system for a video cassette tape recorder is structured such that when tracking-up, tracking-down and tracking-stop signals are applied to a servo integrated circuit from a microcomputer, these signals are counted by an up/down counter to preset to a capstan reference counter and a reference signal of the capstan reference counter is compared with control pulse signals which are read by a control head, thereby executing the capstan phase control operation.

In such a conventional system the tracking variation speed and the variation step are accomplished within the servo integrated circuit, so that users can not control the tracking at the outside.

SUMMARY OF THE INVENTION

Therefore, it is an object of the present invention to provide a remote tracking control system which varies a reference signal of a reference phase counter of a servo integrated circuit by remote control signals of tracking-up and tracking-down signals of a remote transmitter, thereby making the tracking variable.

The above object of the present invention is accomplished by: frequency-dividing color sub-carrier signals and counting the signals at a capstan reference counter; applying the counted signals to a microcomputer as a reference pulse signal when the counted value of the capstan reference counter is zero; outputting tracking trigger pulse signals from the microcomputer at a predetermined delay time on the basis of a point that the reference pulse signal is applied, and applying the tracking trigger pulse signal to a tracking monostable multivibrator by increasing or decreasing the output point of the tracking trigger signal depending upon the tracking up/down key signals which are received from the remote transmitter; beginning to count by a reference phase counter at a trigger point of the tracking monostable multivibrator; obtaining a latch control pulse signal by comparing the control pulse signal with a reference voltage and latching the counted values of the signal; outputting a pulse width modulation signal corresponding to the latched signal where the latched signal and the ring count signal are the same upon comparing them; and smoothing the pulse width modulation signal and mixing it with a speedometer signal and then applying the mixed signal as a drive control signal of a capstan motor.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A to 2H are output waveform views of each section of FIG. 1;

FIG. 3 is an explanatory view illustrating a pulse width modulation signal generating procedure of a pulse width modulation signal generator of FIG. 1.

DETAILED DESCRIPTION OF THE INVENTION

Figure 1:
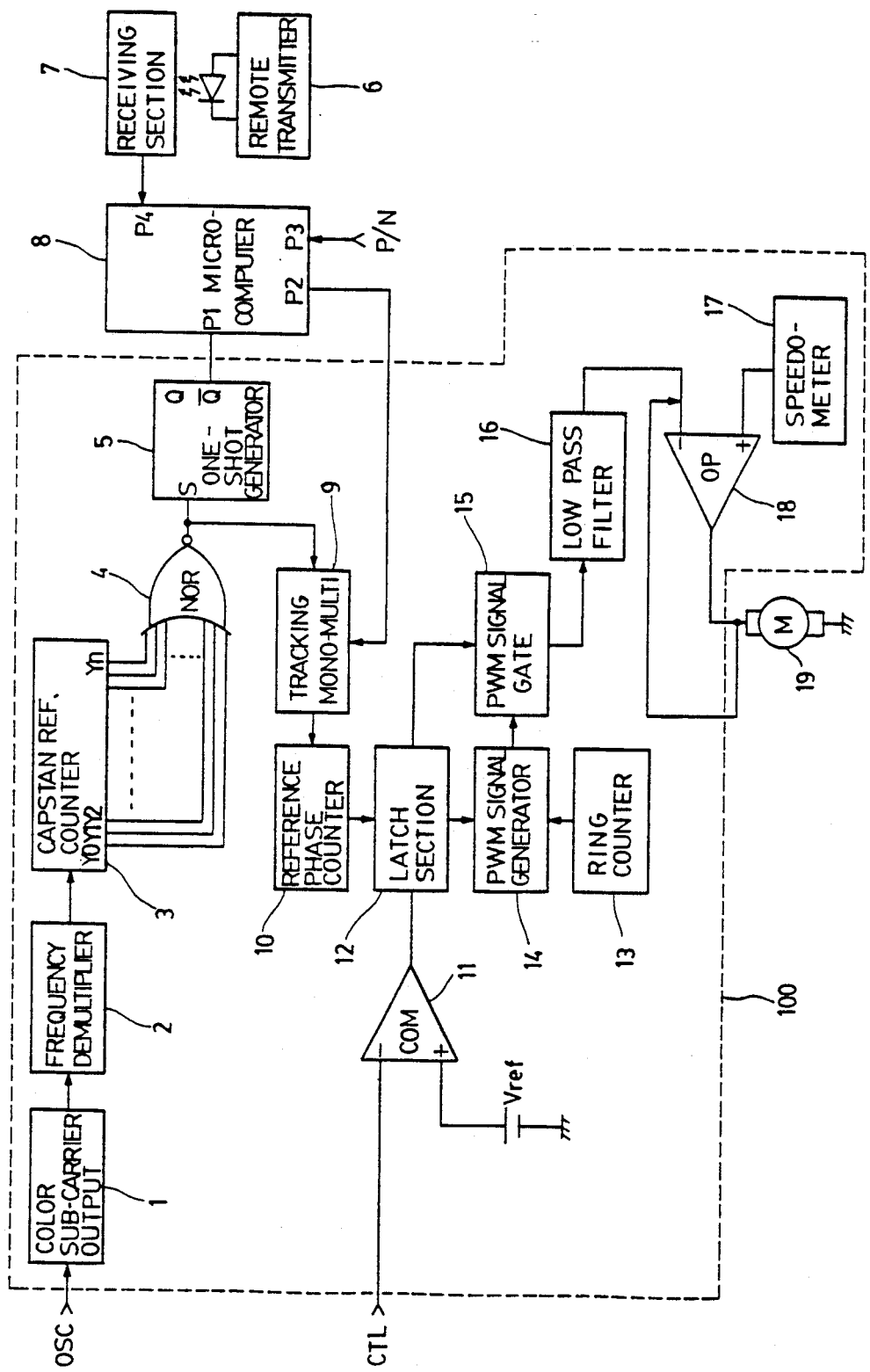
FIG. 1 is a block diagram of a remote tracking control system according to the present invention.

Referring now in detail to the drawings for the purpose of illustrating preferred embodiments of the present invention, the remote tracking control system as shown in FIG. 1, comprises a color sub-carrier output section 1 for outputting a color sub-carrier signal upon receipt of an oscillation signal OSC; a frequency demultiplier 2 for frequency-dividing the color sub-carrier signal of the color sub-carrier output section 1 into reference frequencies according to broadcasting systems; a capstan reference counter 3 for counting the frequency-dividing signal of the frequency demultiplier 2; a NOR gate 4 for outputting pulse signals in response to the reset output signal of the capstan reference counter 3; a one-shot generator 5 for generating a pulse signal each time that a pulse signal is outputted from the NOR gate 4; a receiving section 7 for receiving remote tracking up/down signals which are transmitted from a remote transmitter 6; a microcomputer 8 for receiving a pulse signal of the one-shot generator 5 as a reference signal and outputting tracking trigger pulse signals by increasing or decreasing a predetermined delay time, starting from the reference signal, according to the remote tracking up/down signals which are inputted from the receiving section 7; a tracking monostable multivibrator 9 in which gates are open in response to pulse signals outputted from the NOR gate 4 and being triggered in response to tracking trigger pulse signals which are outputted from the microcomputer 8; a reference phase counter 10 for executing a counting operation from the point that the tracking monostable multivibrator 9 is triggered; a comparator 11 for outputting a spherical pulse signal by comparing a control pulse CTL with a reference voltage Vref; a latch section 12 for latching and outputting the counted value of the reference phase counter 10 in response to the pulse signal which is outputted from the comparator 11; a pulse width modulation signal generator 14 for comparing the output signal of the latch section 12 with the counted value of the ring counter 13 and when the compared values are the same, outputting a pulse width modulation signal corresponding to the output signal of the latch section 12; a pulse width modulation signal gate 15 which allows the pulse width modulation signal of the pulse width modulation signal generator 14 to pass through by the latch control signal of the latch section 12; a low pass filter 16 for smoothing the output signal of the pulse width modulation signal gate 15; and an operational amplifier 18 for mixing the output signal of the low pass filter 16 with the output signal of a speedometer 17, amplifying the mixed signal through a negative feedback loop, and controlling the drive of a capstan motor 19. In FIG. 1, reference symbol P/N represents PAL/NTSC broadcasting mode signal terminals, and numeral 100 is a servo integrated circuit.

The operation and effect of the present invention having the configuration as above will be described in detail with reference to FIGS. 2A to 2H, 3 and 4.

Figure 4:
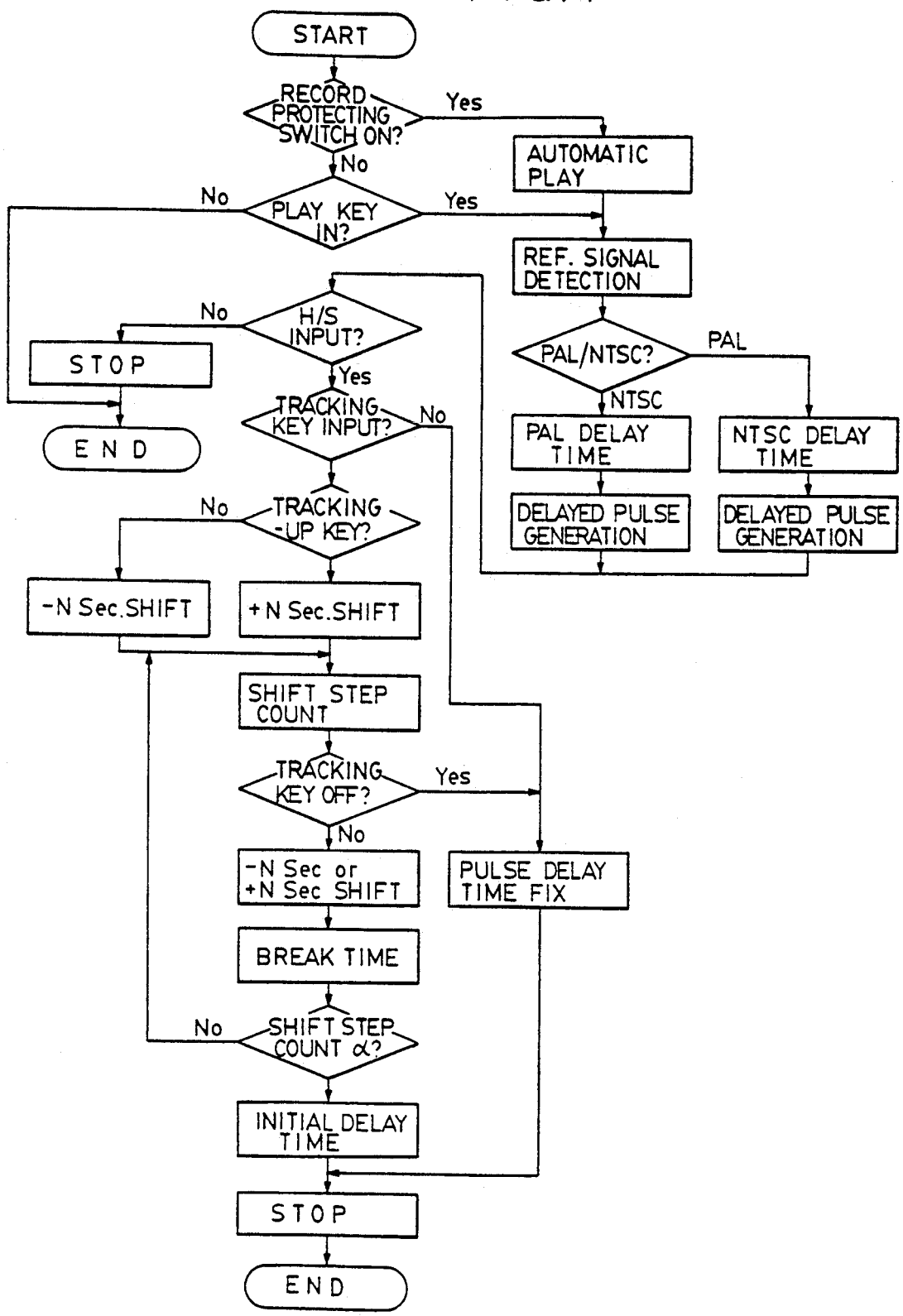
FIG. 4 is a signal flow-chart of a microcomputer of FIG. 1.

The microcomputer 8 is in an automatic play mode in case that a record protecting switch-on signal is inputted as shown in FIG. 4, and in case that the record protecting switch-on signal is not inputted, the microcomputer 8 functions as a play mode when a play key signal is applied from the remote transmitter 6 to the receiving section 7 and inputted to the microcomputer 8. In such a play mode, an oscillation signal OSC is applied to the color sub-carrier output section 1 and a color sub-carrier signal is outputted therefrom. The color sub-carrier signal is frequency-divided into a reference frequency by the frequency demultiplier 2 depending upon the broadcasting system and applied to the capstan reference counter 3 as shown in FIG. 2A so as to be counted thereat.

When the output signal of the capstan reference counter 3 is reset, that is, when low potential signals are outputted from all of the output terminals Yo-Yn of the capstan reference counter 3, a high potential pulse signal is outputted from the NOR gate 4 and applied to a set terminal S of the one shot generator 5, thereby a low potential pulse signal of a predetermined width is outputted from an output terminal $\overline{Q}$ of the one shot generator 5 as shown in FIG. 2C, and applied to a terminal $P_1$ of the microcomputer 8 as a reference signal.

Accordingly, at this time the microcomputer discriminates the broadcasting mode depending upon the signals which are applied to the PAL/NTSC broadcasting mode signal terminal P/N, and in case that the broadcasting mode is the PAL system, a tracking trigger pulse signal is outputted with a delay time according to the PAL broadcasting system, and in case of the NTSC broadcasting system, a tracking trigger pulse signal is outputted with a delay time according to the NTSC broadcasting system. That is, the microcomputer 8 outputs a high potential tracking trigger pulse signal as shown in FIG. 2B, with a predetermined delay time according to the broadcasting system on the basis of a rising edge of the reference signal which is applied to its terminal $P_1$. Where, the reason why the delay time is required is to compensate the X-distance which is prescribed in the VHS system. And, the gate of the tracking monostable multivibrator 9 is open by a high potential pulse signal which is outputted from the NOR gate 4 and the tracking monostable multivibrator 9 is triggered by a tracking trigger pulse signal which is outputted from the microcomputer 8, thereby the reference phase counter 10 begins the counting operation as shown in FIG. 2D, from the point that the tracking monostable multivibrator 9 is triggered, and then applies the counted signals to the latch section 12.

Meanwhile, the microcomputer 8 discriminates the rotation or non-rotation of a head drum depending upon the input or non-input of a head switching signal H/S, and in case that the head drum is not rotated, the microcomputer 8 functions as an automatic stop mode and in case that the head drum is rotated, the microcomputer 8 discriminates whether or not a tracking key signal is inputted.

And, in case that the head drum is rotated as above, control pulses CTL are inputted as shown in FIG. 2E, and the control pulses CTL are compared with a reference voltage Vref at the comparator 11 so that pulse signals are outputted from the output terminal of the comparator 11 as shown in FIG. 2F and applied to the latch section 12 as a latch control signal.

Accordingly, at this time, the count signal which is outputted from the reference phase counter 10 is latched at the latch section 12 and compared with the counted value of the ring counter 13 at the pulse width modulation signal generator 14, and when the compared signals are identical to each other, pulse width modulation signals corresponding thereto are outputted, as shown in FIG. 3.

When the pulses shown in FIG. 2B are shifted, as shown in FIG. 2G or 2H, by a tracking key signal, the count starting point varies with the rising edge of the pulses as shown in FIG. 2G or 2H. That is, the increased starting points of waveforms of FIG. 2D are shifted to the left or right. Thus, the latch values of the latch section 12 are varied in response to the key input.

For example, when a tracking down key is inputted so that the tracking trigger pulse signals shown in FIG. 2B are shifted by (−)Nsec, as shown in FIG. 2G, the latch values of the latch section 12, which are latched at the rising edges of the latch control pulses shown in FIG. 2B, become higher than the previous values. In contrast, when the tracking trigger pulse signals shown in FIG. 2B are shifted by (+)Nsec, as shown in FIG. 2H, since a tracking up key is inputted, the latch values of the latch section 12, which are latched at the rising edges of the latch control pulses shown in FIG. 2F, become lower than their previous values.

At this moment, the PWM signal generator 14 compares the latch values, which were raised or lowered in response to the tracking up/down key input, with the saw-tooth wave signals, which are generated at the ring counter 13, and outputs a high potential signal when the level of the saw-tooth signal is the same as or higher than that of the latch values, as a result of the comparison therebetween.

Accordingly, when the tracking trigger pulse signals shown in FIG. 2B are shifted by (+)Nsec, as shown in FIG. 2H, by the tracking up key signal, the latch values of the latch section 12 become lower than their previous values so that the period in which the saw-tooth signals have larger values than the latch values becomes longer. As a result, the PWM signal generator 14 outputs a pulse-width modulated signal which has a high potential time of "$\phi_1$", as shown in FIG. 3.

By contrast, since higher values are latched when the tracking trigger pulse signal is shifted by (−)Nsec, the time in which the level of the saw-tooth signal becomes higher than the latch values is shorter. As a result, the high potential time of the PWM signals which are outputted from the PWM signal generator 14 is determined as "$\phi_2$", as shown in FIG. 3. These pulse width modulation signals pass through the pulse width modulation signal gate 15 by the latch control signal of the latch section 12 and are smoothed at the low pass filter 16, inputted to a phase terminal of the operational amplifier 18 and then mixed with signals which have pass through the speedometer 17. And, the output signal of the operational amplifier 18 is amplified through a negative feedback loop to control the capstan motor 19.

As a result, the control pulse CTL is servo-controlled so as to be maintained at a slope count value of the reference phase counter 8, thereby enabling the tracking to be varied electrically as much as the X-distance.

On the other hand, the microcomputer 8 discriminates whether or not the tracking key signal is inputted from the receiving section 7 as above. At this moment, in case that the tracking trigger signal is not inputted, the microcomputer 8 fixes the output delay time of the tracking trigger pulse signal, and in case that the tracking trigger signal is inputted, it discriminates again whether the tracking key signal is a tracking-up key signal or a tracking-down key signal. At this moment, as discussed previously, when the signal is a tracking-up key signal, the initial delay time Ti of the tracking trigger pulse signals which are outputted as shown in FIG. 2B is more delayed as much as the shift time(+N second) as shown in FIG. 2H, and in case of a tracking-down key signal, the initial delay time Ti of the tracking trigger pulse signals is less delayed as much as the shift time(−N second) as shown in FIG. 2G.

Each time that the initial delay time Ti is shifted by +N second or −N second, the shift step is counted up or down by 1 and when the tracking key signal is an Off-state, the output delay time of the shifted tracking trigger pulse signal is fixed, and in case that the tracking key signal is not in the Off-state, shifting by +N second or −N second in response to the tracking-up signal or the tracking-down signal. Thereafter, it is discriminated whether or not the shift step count value is over a predetermined number of times α after having a certain break time, at this moment in case that the count value is not over the predetermined number of times α, the procedure after the shift step counting procedure is repeatedly carried out, and in case that the count value is over the predetermined number of times α, the output delay time of the tracking trigger pulse signal is set at the initial delay time Ti and then completing the tracking operation.

As above, the tracking operation is controlled by increasing or decreasing the initial delay time of the tracking trigger pulse signal by +N second or −N second according as a tracking-up key signal or a tracking-down key signal is inputted to the microcomputer 8.

What is claimed is:

1. A remote tracking control system, comprising:
   a frequency demultiplier for frequency-dividing a color sub-carrier signal from a color sub-carrier output section to produce a reference frequency;
   a capstan reference counter for counting the frequency-divided signal from the frequency demultiplier;
   a NOR gate for outputting first pulse signals in response to a reset output signal from the capstan reference counter;
   a one-shot generator for generating a second pulse signal in response to the first pulse signals from the NOR gate;
   a microcomputer for receiving the second pulse signal from the one-shot generator as a reference signal, and outputting a tracking trigger pulse signal by increasing or decreasing a delay time, based on the reference signal received, in response to a tracking-up signal or a tracking-down signal which is inputted into the microcomputer from a receiving section for receiving transmitted signals from a remote transmitter;
   a tracking monostable multivibrator having a gate which is opened by the first pulse signals from the NOR gate, and being triggered by the tracking trigger pulse signal from the microcomputer;
   a reference phase counter for counting from the trigger point of the tracking monostable multivibrator;
   a comparator for comparing a control pulse signal with a reference voltage to output a third pulse signal;
   a latch section for latching and outputting the counted value of the reference phase counter in response to the third pulse signal from the comparator;
   a pulse width modulation signal generator for comparing the output signal of the latch section with a counted value from a ring counter and outputting a pulse width modulation signal corresponding to the output signal of the latch section when the compared values are identical to each other;
   a pulse width modulation signal gate which allows the pulse width modulation signal from the pulse width modulation signal generator to pass therethrough;
   a low pass filter for smoothing the output signal of the pulse width modulation signal gate; and
   an operational amplifier for mixing the output signal of the low pass filter with an output of a speedometer and amplifying the mixed signal through a negative feedback loop to control the driving of a capstan motor.

2. The system as claimed in claim 1, wherein the microcomputer makes the output delay time of the tracking trigger pulse signal vary depending upon a signal being applied to a PAL/NTSC broadcasting mode signal terminal.

3. The system as claimed in claim 1, wherein the microcomputer produces a first output delay time for the tracking trigger pulse signal if a signal being applied to a PAL/NTSC broadcasting mode signal terminal is a PAL broadcasting signal, and produces a second output delay time for the tracking trigger pulse signal if said signal is a NTSC broadcasting signal being applied.

* * * * *